(12) United States Patent
Pascal et al.

(10) Patent No.: US 12,140,107 B2
(45) Date of Patent: Nov. 12, 2024

(54) THRUST REVERSER FOR THE NACELLE OF AN AIRCRAFT TURBOFAN ENGINE

(71) Applicant: SAFRAN NACELLES, Gonfreville-l'Orcher (FR)

(72) Inventors: Sebastien Laurent Marie Pascal, Moissy-Cramayel (FR); Luigi Bisanti, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/556,312

(22) PCT Filed: Apr. 27, 2022

(86) PCT No.: PCT/FR2022/050797
§ 371 (c)(1),
(2) Date: Oct. 19, 2023

(87) PCT Pub. No.: WO2022/229556
PCT Pub. Date: Nov. 3, 2022

(65) Prior Publication Data
US 2024/0209813 A1 Jun. 27, 2024

(30) Foreign Application Priority Data

Apr. 30, 2021 (FR) ...................... 2104530

(51) Int. Cl.
*F02K 1/72* (2006.01)
*F02K 1/76* (2006.01)
*F02K 1/80* (2006.01)

(52) U.S. Cl.
CPC ............. *F02K 1/72* (2013.01); *F02K 1/763* (2013.01); *F02K 1/805* (2013.01); *F05D 2240/55* (2013.01)

(58) Field of Classification Search
CPC ... F02K 1/70; F02K 1/72; F02K 1/763; F02K 1/805; F05D 2240/55
See application file for complete search history.

(56) References Cited

U.S. PATENT DOCUMENTS

| 3,797,785 | A | 3/1974 | Baerresen et al. |
| 6,385,964 | B2 | 5/2002 | Jean et al. |
| 8,793,973 | B2 * | 8/2014 | Vauchel ................. F02K 1/72 239/265.29 |

(Continued)

FOREIGN PATENT DOCUMENTS

| FR | 2938878 A1 | 5/2010 |
| FR | 2954410 A1 | 6/2011 |

OTHER PUBLICATIONS

International Search Report received for PCT Patent Application No. PCT/FR2022/050797, mailed on Sep. 23, 2022, 5 pages (2 pages of English Translation and 3 pages of Original Document).

*Primary Examiner* — Loren C Edwards
(74) *Attorney, Agent, or Firm* — WOMBLE BOND DICKINSON (US) LLP

(57) ABSTRACT

A thrust reverser for an aircraft bypass turbojet engine nacelle, this thrust reverser having a generally annular shape around an axis and including in particular flaps for deflecting the secondary flow through gratings, each of these flaps having a rigid wall and sealing elements located on the outer face of this wall, these sealing elements extending along side edges of the flap so as to provide a seal along these edges in the first position.

15 Claims, 6 Drawing Sheets

(56) References Cited

U.S. PATENT DOCUMENTS

2011/0284660 A1  11/2011  Vauchel et al.
2012/0256051 A1  10/2012  Bellanger et al.
2020/0003151 A1   1/2020  Carr

* cited by examiner

[Fig.1]
PRIOR ART
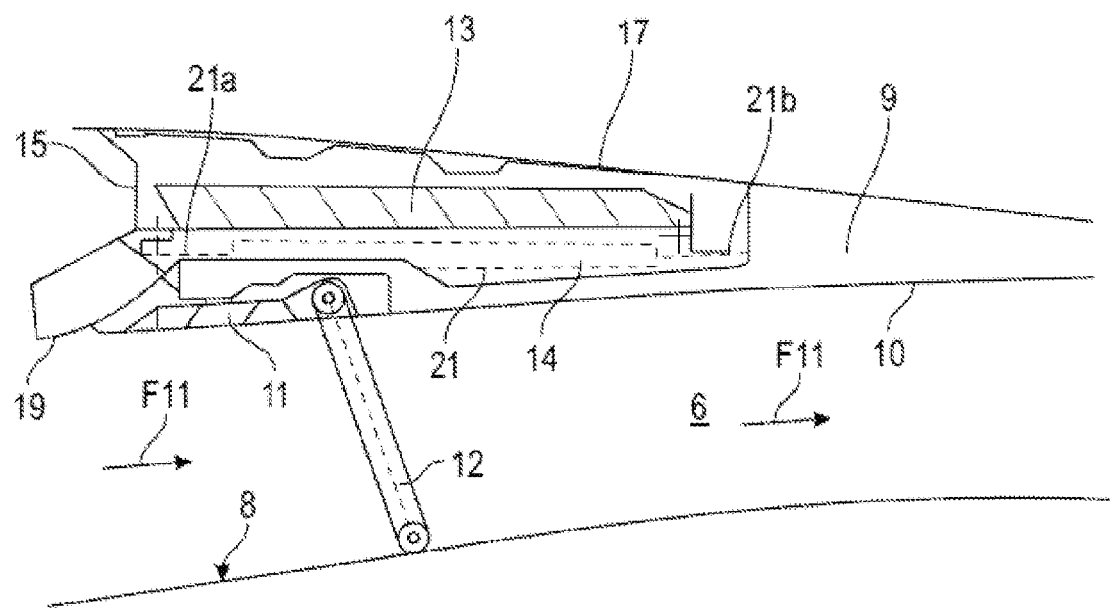
[Fig.2]
PRIOR ART
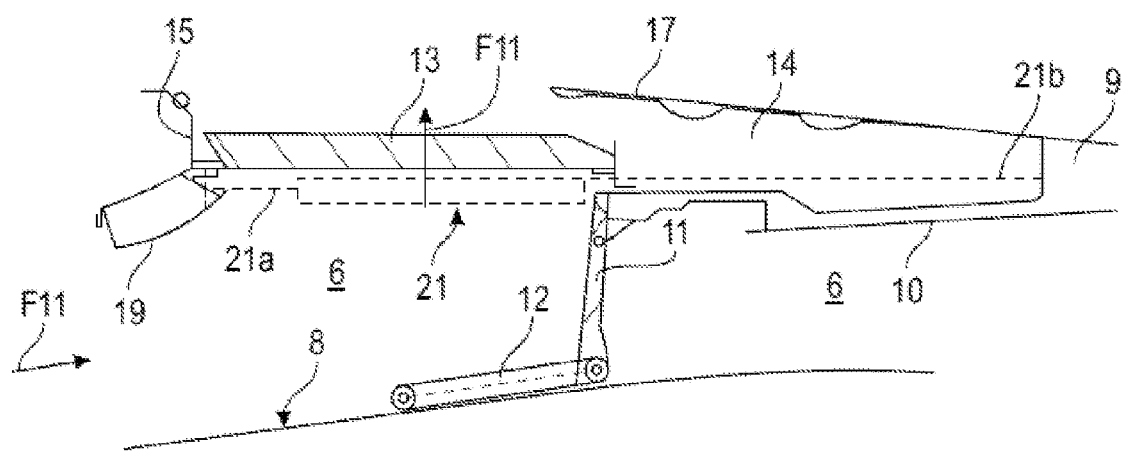

[Fig.3]
PRIOR ART
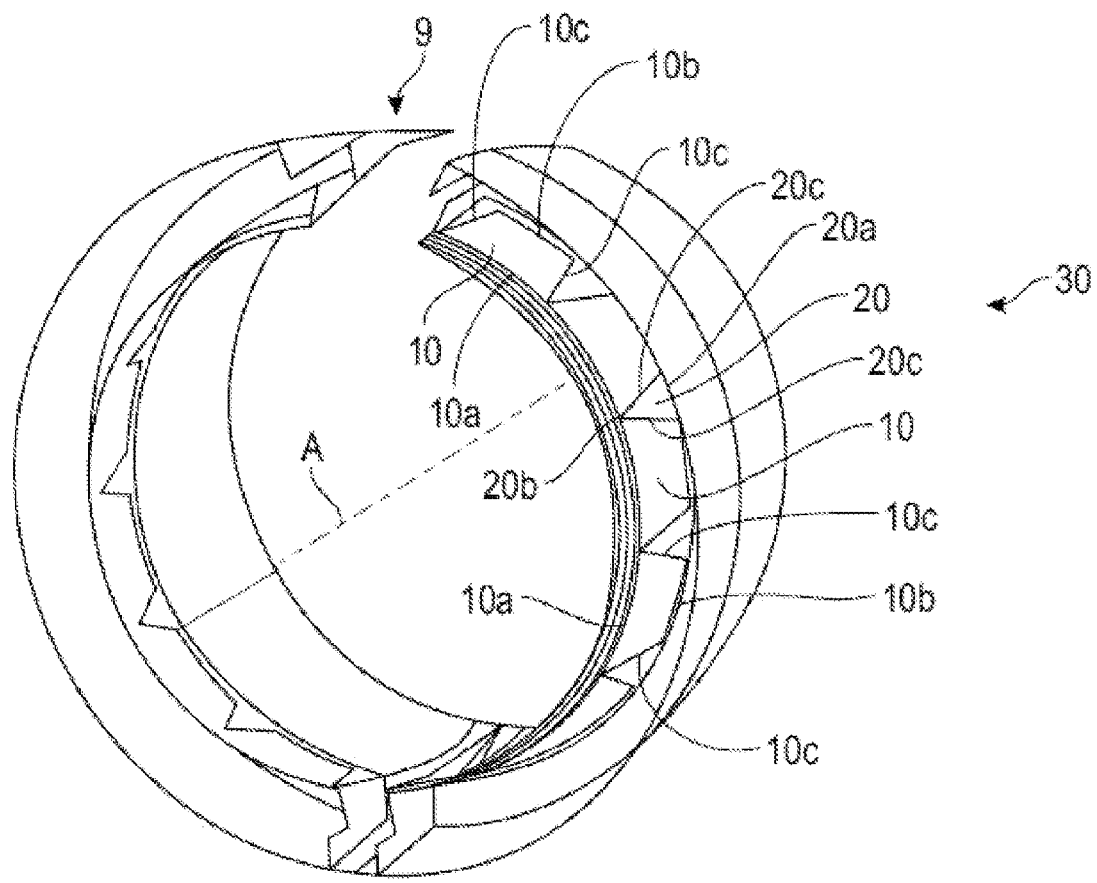

[Fig.4]
PRIOR ART
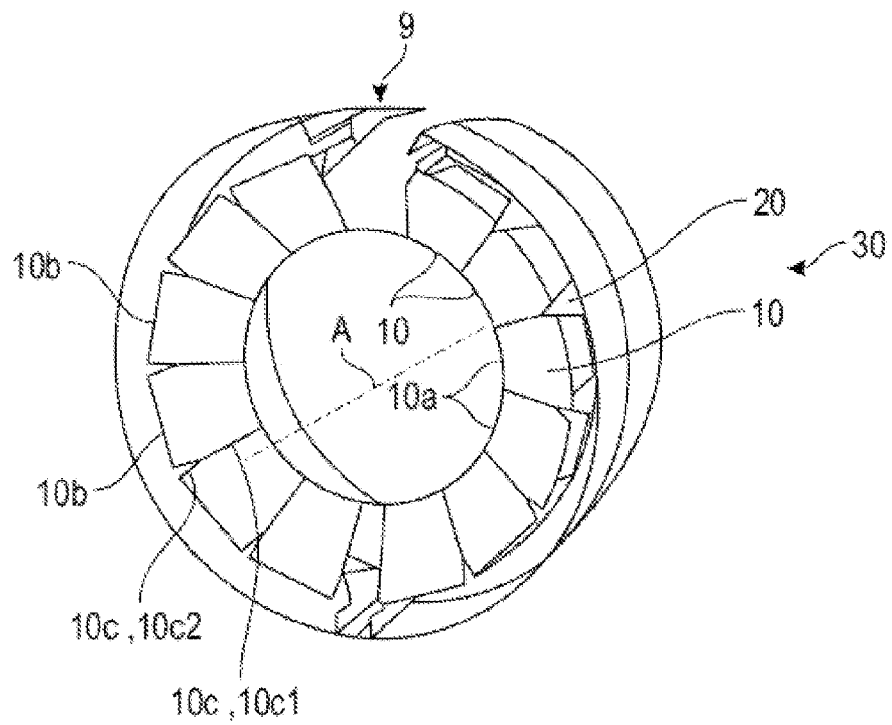
[Fig.5]
PRIOR ART
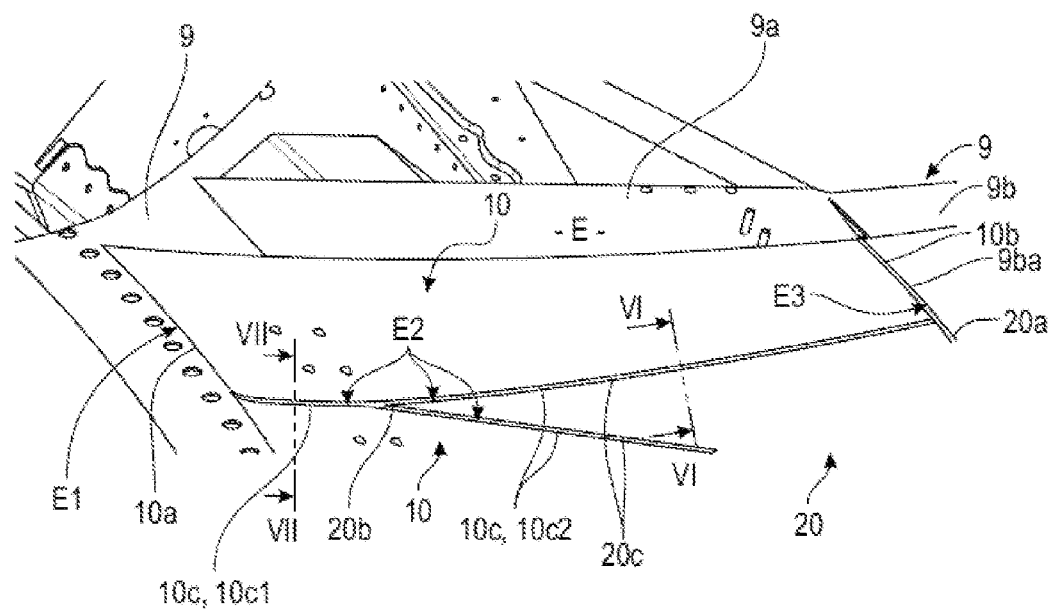

[Fig.6]
PRIOR ART
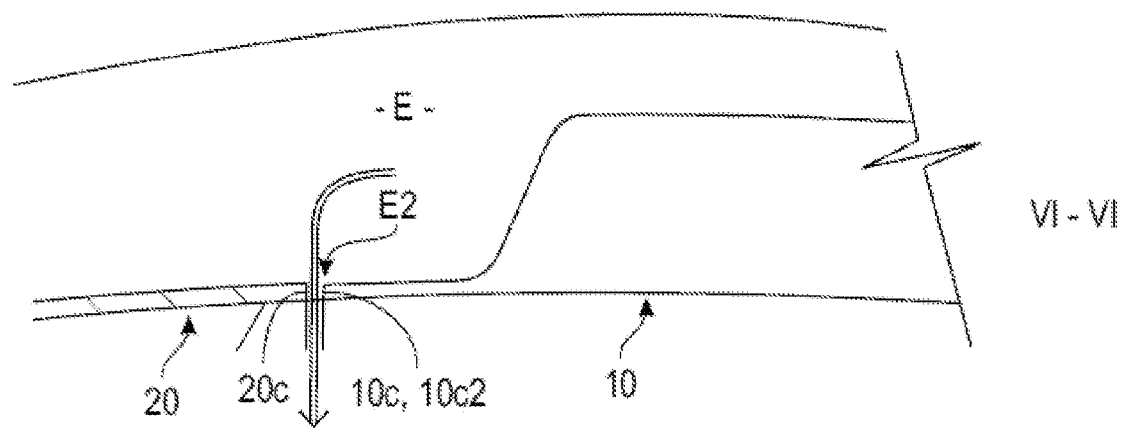
[Fig.7]
PRIOR ART
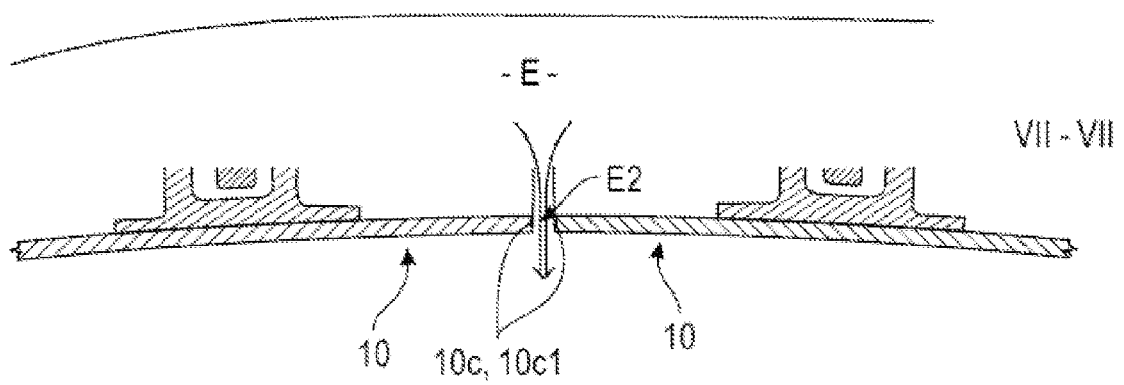

[Fig.8]
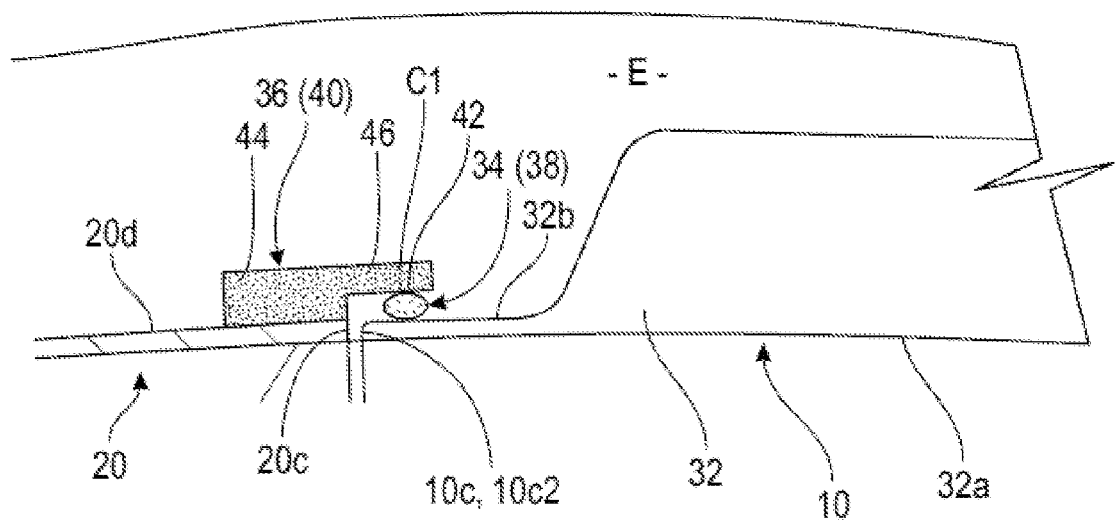
[Fig.9]
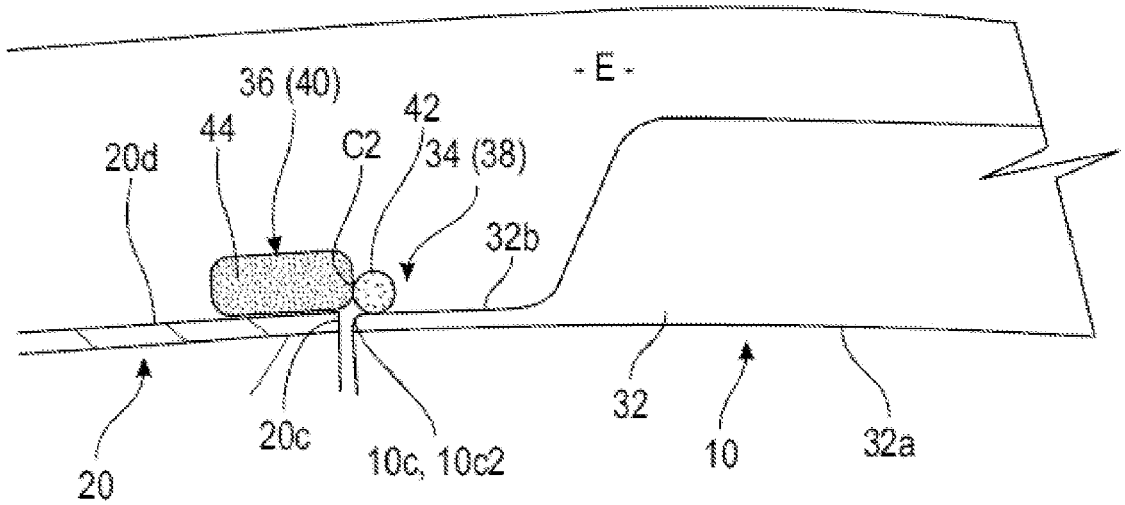

[Fig.10]
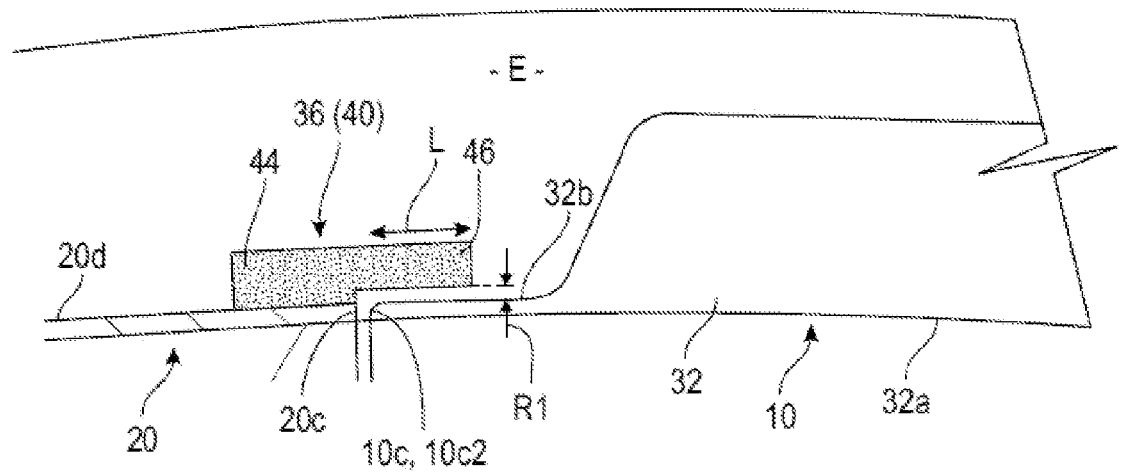
[Fig.11]
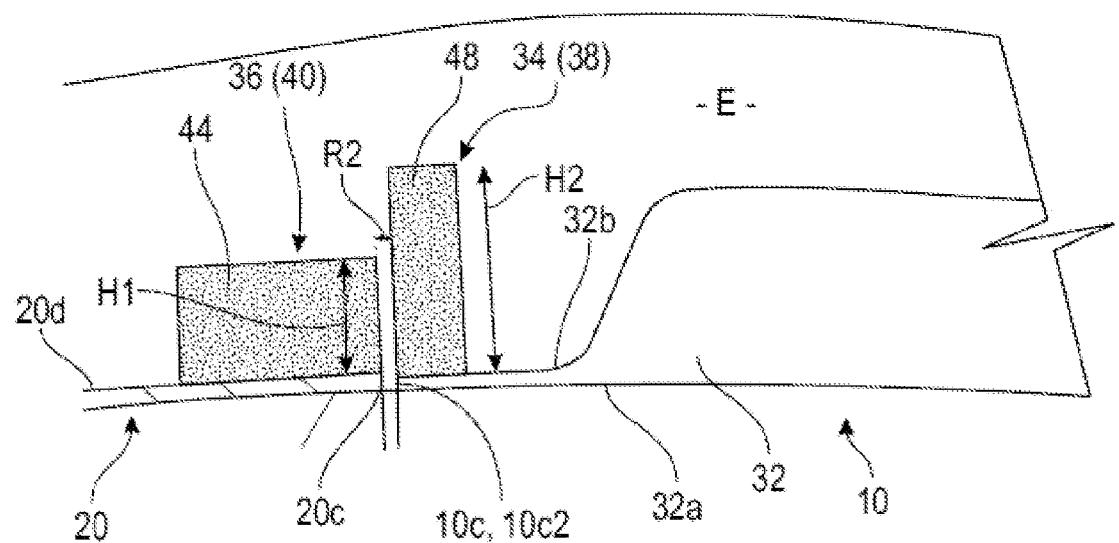

THRUST REVERSER FOR THE NACELLE OF AN AIRCRAFT TURBOFAN ENGINE

TECHNICAL FIELD OF THE INVENTION

The invention relates to the field of the aircraft turbofan engine nacelles, and in particular to the thrust reversers equipped to these nacelles.

TECHNICAL BACKGROUND

The technical background comprises in particular the documents FR-A1-2 938 878, FR-A1-2 954 410, US-A1-2020/003151, U.S. Pat. No. 3,797,785 and US-B2-6,385,964.

The thrust reversers are now widely used in the aircraft nacelles and, in particular, in the nacelles housing a turbofan engine. In a known way, such a turbojet engine generates, by means of the blades of a rotating fan, a hot air flow (referred to as primary flow) coming from a combustion chamber, and a cold air flow (referred to as secondary flow) which circulates outside the turbojet engine through an annular channel, formed between a fairing of the turbojet engine and an internal wall of the nacelle. The two air flows are then ejected out of the turbojet engine through the rear of the nacelle and thus generate a thrust.

In such a configuration, the role of a thrust reverser is, during a landing phase of the aircraft, to improve its braking capacity on the ground by redirecting forward at least one portion of the thrust generated by the turbojet engine. In particular, when the thrust reverser is in action, it obstructs the annular channel of the cold air flow (i.e. the secondary flow) and directs this flow towards the front of the nacelle, thus generating a counter-thrust.

The means implemented to redirect the flow of cold air vary according to the type of reverser. However, in all cases, the structure of a thrust reverser comprises one or more movable covers that can be moved between, on the one hand, an extended position (also referred to as thrust reversal position) in which they open up a passage in the nacelle for the deflected flow, and on the other hand, a retracted position (also referred to as the direct jet position) in which they close off this passage. The covers can thus be used to activate other deflection means such as flaps. In this case, the flaps, activated by the movement of the movable covers, obstruct, at least in part, the channel in which the secondary flow circulates.

In addition, in the case of a thrust reverser with deflection grids, the redirection of the air flow is then performed by deflection grids.

A prior art reverser is illustrated in FIGS. 1 and 2. This reverser is of the grid reverser or cascade reverser type.

This type of reverser comprises at least one cover 9 which is movable relative to a stationary structure comprising an upstream annular frame 15, the cover 9 having an external wall 17 and an internal wall 10 intended to delimit, in a direct jet position of the turbojet (FIG. 1), an external wall of the annular duct 6 in which the secondary flow F11 flows. The reverser also comprises flaps 11 mounted in an articulated manner on the mobile cover 9 and actuated by connecting rods 12 when the movable cover is moved downstream, so that, in a thrust reversal position (FIG. 2), each flap 11 comprises an area extending into the annular channel 6 so as to divert at least a portion of the secondary flow F11 out of the duct 6.

In the case of this type of reverser, the secondary flow F11 is redirected by deflection grids 13, the movable cover 9 having only a simple sliding function aimed at uncovering or covering these grids 13, the translation of the movable cover 9 taking place along a longitudinal axis substantially parallel to the axis of the nacelle 1 and to the reverser.

A housing 14 is provided in the cover 10 to allow housing the grids 13 when the reverser is not actuated, i.e., in the direct jet position, as shown in FIG. 1. Alternatively, the grids 13 could be slidably mounted and housed in the stationary structure.

The grids 13 are arranged adjacent to each other in an annular area surrounding the annular channel 6, the grids 13 being arranged edge to edge with the smallest possible gap between them. In this way, the vast majority of the secondary flow F11 deflected by the flaps 10 passes through the grids 13.

The grids can be attached to the structure at their upstream ends, as shown in the drawings. Alternatively, as described in the previous application FR-A1-3 076 865, the downstream ends of the grids can be attached to the cover.

An annular deflection element 19, commonly referred to as a deflection edge, covers the internal periphery of the frame 15. This deflection element 19 is rounded in cross-section and extends from the external periphery of the annular duct 6 to the upstream end of the grids 13. The frame 15 and the deflection element 19 form a stationary annular structure.

The thrust reverser also comprises means for moving and guiding the movable covers 9, which generally comprise actuators 21, each of which has an elongated shape and extends parallel to the axis of the thrust reverser. Each actuator 21 has an upstream end 21a attached to the stationary structure comprising the frame 15, and a downstream end 21b which is attached to the cover. In the aforementioned variant where the grids are mounted sliding, the actuator is mounted between the stationary structure and the grids.

FIGS. 3 and 4 allow to show the flaps 10 in the first position corresponding to FIG. 1 (FIG. 3), and in the second position for deflecting the secondary flow F11 corresponding to FIG. 2 (FIG. 4).

FIGS. 3 and 4 allow to show the shape of each of these flaps 10 and also allow to show fairings 20 which are carried by the cover 9 and are arranged between the flaps 10.

The fairings 20 are distributed around the axis A of the thrust reverser 30 and are each generally triangular or frustoconical in shape. Each of these fairings 20 comprises a downstream base 20a connected to the cover, an upstream tip 20b, and two lateral edges 20c connecting the tip 20b to the base 20a.

The flaps 10 are distributed around the axis A and mounted between the fairings 20. Each flap 10 comprises:
an upstream edge 10a intended to be located downstream of the deflection element 19 (generally with the interposition of an intermediate shell) in the first position,
a downstream edge 10b designed to be flush with the cover 9 in the first position, and
lateral edges 10c each comprising two rectilinear portions, upstream 10c1 and downstream 10c2 respectively. The upstream portions 10c1 of the lateral edges 10c of the flaps 10 are intended to be flush with the upstream portions 10c1 of the lateral edges 10c of adjacent flaps 10 in the first position, and the downstream portions 10c2 of the lateral edges 10c of the flaps 10 are intended on the one hand to be flush with the lateral edges 20c of the fairings 20 in the first position (FIG. 3), and on the other hand the downstream portions 10c2 of the lateral edges 10c of the flaps 10 in the second position (FIG. 4).

FIGS. 5 and 6 are larger-scale views of the flaps 10 and fairings 20 and show that the flaps 10 and the fairings 20 extend in line with each other in the first aforementioned position.

FIG. 5 also shows that the flaps 10 extend inside an upstream annular segment 9a of the cover 9 and at a radial distance from this segment 9a. The cover 9 also comprises a downstream annular segment 9b which extends downstream from the flaps 10 and fairings 20. In other words, the downstream bases 20a of the fairings 20 are connected to an upstream end 9ba of this downstream segment 9b of the cover 9, and the downstream edges 10b of the flaps 10 are flush with this upstream end 9ba of the downstream segment 9b of the cover 9 in the first aforementioned position.

The flaps 10 define an annular space E with the upstream segment of the cover 9.

In operation, air from the secondary flow 11 can enter this space E through the gap E1 formed between the upstream edges 10a of the flaps 10 and the deflection element 19 (or between the upstream edges 10a and the intermediate shell interposed between the flaps 10 and the deflection element 19). This air circulates in the space E, then is ejected through the gaps E2, E3 formed on the one hand between the lateral edges 10c of the flaps 10 and the lateral edges 10c, 20c of the adjacent flaps 10 (FIG. 8) or fairings 20 (FIG. 7), and between the downstream edges 10b of the flaps 10 and the upstream end 9ba of the downstream segment 9b of the cover 9. When this air is ejected, vortex structures form in the secondary duct 6, generating losses of thrust, which is problematic.

A first solution to this problem would be to reduce the dimensions of the gaps E1, E2 and E3 as much as possible. However, managing these dimensions is becoming increasingly complex with the use of composite materials for the flaps. These materials are relatively flexible and tend to deform during operation. It is therefore very difficult to control the dimensions of the gaps, particularly for large-diameter turbojet engines.

A second solution would be to provide seals upstream of the flaps 10, between the upstream edges 10a of these flaps and the deflection element 19, to prevent air from entering the space E. However, this solution would not be satisfactory either, as the seals would increase the forces applied by the actuator 21 to the deflection element 19. The seals should be relatively large to compensate for the relative displacements between the stationary structure and the movable elements, which would increase their mass.

Furthermore, in the thrust reversal position, the presence of the seals upstream of the flaps 10 could interfere with the thrust reverser opening kinematics by coming into contact with the cover 9 or other elements of the turbojet engine in the second reverse thrust position.

A third solution would be to provide flaps 10 with walls equipped with elastically deformable lateral extensions. These flexible lateral extensions would extend from the main wall of each flap and define the lateral edges of that flap. These extensions would be designed to cooperate in a sealed manner with the elements located in the vicinity of the flap 10. However, this solution would not be satisfactory either. In the thrust reversal position, these flexible extensions would be subjected to the unsteady reverse flow, which would damage them. These extensions would have to be integrated into flaps 10 and would not be easily replaceable. Furthermore, the presence of these lateral extensions would result in a reduction in the acoustic surfaces of the flaps 10 and in risks of contact and damage with the cover 9 or other elements of the turbojet engine in the second reverse thrust position.

The invention proposes a simple, effective and economical solution to the above problem.

SUMMARY OF THE INVENTION

The present invention proposes a thrust reverser for a nacelle of an aircraft turbofan engine, this thrust reverser being generally annular about an axis and comprising:
  a stationary upstream annular structure extending around a secondary flow annular duct,
  deflection grids distributed around the axis,
  at least one annular cover that can move in axial translation relative to the stationary structure, from an upstream position in which the grids are covered to a downstream thrust reversal position in which the grids are uncovered, this cover comprising an upstream annular segment and a downstream annular segment
  fairings carried by the cover, these fairings being distributed around the axis, each of these fairings extending inside and at a distance from the upstream segment of the cover and comprising a downstream base connected to an upstream end of the downstream annular segment of the cover, an upstream tip, and two lateral edges connecting the tip to the base,
  deflection flaps for deflecting the secondary flow through the grids, the flaps being distributed around the axis and mounted between the fairings, the flaps being movable from a first position in which they extend inside and at a distance from the upstream segment of the cover and in the extension of the adjacent fairings, when the cover is in the upstream position, and a second position in which they extend into the duct to deflect the secondary flow, when the cover is in its downstream position, each of these flaps comprising:
    an upstream edge designed to be flush with said upstream structure in the first position,
    a downstream edge intended to be flush with the upstream end of the downstream segment of the cover in the first position, and
    lateral edges each comprising two portions, upstream and downstream respectively, the upstream portions of the lateral edges of the flaps being intended to be flush with the upstream portions of the lateral edges of adjacent flaps in the first position, and the downstream portions of the lateral edges of the flaps being intended on the one hand to be flush with the lateral edges of the fairings in the first position, and on the other hand the downstream portions of the lateral edges of the flaps in the second position,
  and a moving device for moving the cover and the flaps, or even the grids, characterised in that each of the flaps comprises a rigid wall extending as far as the upstream, downstream and lateral edges, and defining these edges, this wall comprising an aerodynamic internal face and an external face facing the upstream segment of the cover in the first position,
and in that the reverser further comprises:
  first sealing elements located on the external face of the wall of each flap and/or on an external face of the fairings, these first sealing elements extending along the lateral edges of the flap and/or of the fairings so as to provide a sealing along these edges in the first position.

The invention allows to limit the flowing of air from the aforementioned space, located between the flaps and the upstream segment of the cover, through the lateral gaps located between the lateral edges of the flaps and the lateral edges of the fairings and of the adjacent flaps. The sealing elements, for example, allow the air contained in this space to lose its energy, or to be deflected or blocked, before reaching the gaps.

In this application, "rigid" means an element or a material that is not flexible or elastically deformable. A rigid element or material is therefore an element that is not elastically deformable. By "flexible" we mean an element or a material that is elastically deformable.

In this application, "sealing" means reducing or eliminating gas leakage between two elements. If these two elements are in sealed contact, the gas leaks are prevented.

In the absence of contact, for example where the clearance between the elements is reduced to minimise the leakage between those elements, the sealing is provided by the loss of energy from the gas flowing between the elements.

The reverser according to the invention may comprise one or more of the following characteristics, taken alone or in combination with each other:
- the fairings are each generally triangular or frustoconical in shape;
- in the above-mentioned upstream position, the grids are covered by the upstream annular structure or the annular cover;
- each of these fairings extends in the continuity of the downstream annular segment of the cover, and is therefore integrated into this downstream segment;
- the moving device comprises at least one actuator;
- the device or the actuator comprises a first axial end, in particular an upstream end, attached to said structure, and a second axial end, in particular a downstream end, attached to said cover;
- the grids comprise upstream ends attached to said structure or downstream ends attached to said cover;
- each of the flaps has no sealing element along its upstream edge;
- the first sealing elements are fitted and attached to the external face of the wall of each flap and/or to the external face of the fairings;
- the first sealing elements are integrated into the wall of the flap and/or into the fairing;
- the first sealing elements are at least partly (or entirely) rigid;
- the first sealing elements comprise:
    - a first elastically deformable longitudinal member which extends along the lateral edge of the flap, and a second rigid longitudinal member which extends along the lateral edge of the fairing and which cooperates by sealed support with said first member, in said first position,
    - or conversely, a first elastically deformable longitudinal member which extends along the lateral edge of the fairing, and a second rigid longitudinal member which extends along the lateral edge of the flap and which cooperates by sealed support with said first member, in said first position;
- the first member is circular or elliptical in cross-section;
- the first member comprises at least one sealing lip;
- said sealed support is a radially oriented support or a circumferentially oriented support with respect to said axis;
- the second member is L-shaped or parallelepipedal in cross-section;
- the second member comprises a longitudinal profile extending along the edge to which it is attached and generating a radial excessive thickness on this edge;
- the profile comprises a longitudinal rim forming a lateral extension of the edge to which the second member is attached;
- the first sealing elements comprise:
    - a first rigid longitudinal member which extends along the lateral edge of the flap, and optionally a second rigid longitudinal member which extends along the lateral edge of the fairing and which is separated by a predetermined clearance from said first member, in said first position,
    - or conversely, a first rigid longitudinal member which extends along the lateral edge of the fairing, and optionally a second rigid longitudinal member which extends along the lateral edge of the flap and which is separated by a predetermined clearance from said first member, in said first position;
- said clearance is a radial clearance or a circumferential clearance with respect to said axis;
- each of the flaps comprises:
    - at least one second sealing element located on the external face of the wall and/or on the upstream end of the downstream segment of the cover, this second sealing element extending along the downstream edge of the flap so as to seal or reduce the leakages along this edge in the first position;
- the second element is identical to said first elements;
- the second sealing element is fitted and attached to the external face and/or to the upstream end of the downstream segment of the cover;
- the second sealing element is integrated into the wall of the flap and/or on the upstream end of the downstream segment of the cover;
- the second sealing element is at least partly (or integrally) rigid.

The invention also relates to an aircraft propulsion unit comprising a turbofan engine and a thrust reverser as described above.

BRIEF DESCRIPTION OF THE FIGURES

The invention will be better understood and other details, characteristics and advantages of the present invention will become clearer from the following description made by way of non-limiting example and with reference to the attached drawings, in which:

FIG. 1 is a partial schematic view, in longitudinal cross-section, of a thrust reverser according to the prior art in the direct jet position;

FIG. 2 is a partial schematic view, in longitudinal cross-section, of the thrust reverser of FIG. 1 in the thrust reversal position;

FIG. 3 is a schematic perspective view of a thrust reverser in the direct jet position;

FIG. 4 is a schematic perspective view of the thrust reverser in FIG. 3, in the thrust reversal position;

FIG. 5 is a partial schematic perspective view of a thrust reverser and shows flaps and fairings of this reverser in the direct jet position;

FIG. 6 is a schematic cross-section along the line VI-VI of FIG. 5;

FIG. 7 is a schematic cross-sectional view along the line VII-VII of FIG. 5;

FIG. 8 is a view similar to FIG. 5 and represents a first embodiment of the invention;

FIG. 9 is a view similar to FIG. 5 and represents a second embodiment of the invention;

FIG. 10 is a view similar to FIG. 5 and represents a third embodiment of the invention; and FIG. 11 is a view similar to FIG. 5 and represents a fourth embodiment of the invention.

DETAILED DESCRIPTION OF THE INVENTION

FIGS. 1 to 7 have been described above.

Reference is now made to FIGS. 8 to 12, which illustrate several embodiments of a thrust reverser 30 according to the invention for an aircraft turbojet engine nacelle.

The preceding description in relation to FIGS. 1 to 7 applies to the thrust reverser 30 according to the invention.

This reverser 30 comprises in particular:
- a stationary upstream annular structure extending around an annular flow duct for a secondary flow, this structure comprising the casing 15 and the deflection element 19 in the example shown in FIGS. 1 and 2,
- deflection grids 13 which are distributed around the axis A of the reverser 30,
- at least one annular cover 9 which can move in axial translation with respect to the stationary structure, from an upstream position (FIGS. 1, 3, 5 and 6) in which the grids 13 are covered, to a downstream thrust-reversal position (FIGS. 2 and 4) in which the grids 13 are uncovered, this cover 9 comprising an upstream annular segment 9a and a downstream annular segment 9b,
- fairings 20 carried by the cover 9, these fairings 9 being distributed around the axis A and each having a generally triangular or frustoconical shape in the example shown, each of these fairings 20 extending inside and at a distance from the upstream segment 9a of the cover 9 and comprising a downstream base 20a connected to an upstream end 9ba of the downstream annular segment 9b of the cover 9, an upstream tip 20b, and two lateral edges 20c connecting the tip 20b to the base 20a,
- flaps 10 for deflecting the secondary flow F11 through the grids 13, the flaps 10 being distributed around the axis A and mounted between the fairings 20, the flaps 10 being movable from a first position (FIGS. 1, 3, 5 and 6) in which they extend inside and at a distance from the upstream segment 9a of the cover and in the extension of the adjacent fairings 20, when the cover 9 is in the upstream position, and a second position (FIGS. 2 and 4) in which they extend into the duct 6 to divert the secondary flow F11, when the cover 9 is in its downstream position.

Each of the flaps 10 comprises:
- an upstream edge 10a designed to be flush with the upstream structure in the first position,
- a downstream edge 10b designed to be flush with the upstream end 9ba of the downstream segment 9b of the cover 9 in the first position, and
- lateral edges 10c each comprising two portions, upstream 10c1 and downstream 10c2 respectively. These upstream portions 10c1 of the lateral edges 10c of the flaps 10 are intended to be flush with the upstream portions 10c1 of the lateral edges 10c of adjacent flaps 10 in the first position, and the downstream portions 10c2 of the lateral edges 10c of the flaps 10 being intended on the one hand to be flush with the lateral edges 20c of the fairings 20 in the first position, and on the other hand the downstream portions 10c2 of the lateral edges 10c of the flaps 10 in the second position.

The reverser 30 also comprises actuators 20 for moving the cover 9 and the flaps 10 between the aforementioned positions.

Each of the flaps 10 comprises a rigid wall 32 extending to and defining the upstream 10a, the downstream 10b and the lateral edges 10c. This wall 32 comprises an aerodynamic internal face 32a and an external face 32b facing the upstream segment 9a of the cover 9 in the first position. This wall 32 is made of aluminium, thermosetting composite or thermoplastic composite, for example.

According to the invention, the reverser 30 also comprises sealing elements located on the external face 32b of the wall 32 of each flap 10 and/or on an external face 20d of the fairings 20.

The sealing elements preferably extend along the peripheral edges of the flaps 10 and of the fairings 20. The sealing elements extending along the lateral edges 10c are referred to as first sealing elements, referenced 34, and the sealing elements extending along the lateral edges 20c of the fairings 20 are referred to as first sealing elements, referenced 36. These first sealing elements 34, 36 provide a sealing by loss of energy of the lateral flows along these lateral edges 10c, 20c in the first position.

Second sealing elements, referred to as 38, are the sealing elements extending along the downstream edges 10b of the flaps, and second sealing elements, referred to as 40, are the sealing elements extending along the edges facing the upstream end 9ba of the downstream segment 9b of the cover 9. These second sealing elements 38, 40 provide a sealing along these edges 10b in the first position.

FIGS. 8 to 11 illustrate several embodiments in which these sealing elements 34 to 40 can be used. Although the figures show the particular case of the sealing (and sealing elements 34, 36) between the edge 10c of a flap 10 and the edge 20c of a fairing, these figures and the associated description are transposable to the case of the sealing (and of the sealing elements 34, 36) between two edges 10c of two adjacent flaps 10, and the sealing (and sealing elements 38, 40) between the edge 10b of a flap and the upstream end 9ba of the downstream segment 9b of the cover 9.

In the first embodiment shown in FIG. 8, the first sealing elements 34 of the flap 10 comprise a first elastically deformable longitudinal member 42 which extends along the lateral edge 10c of the flap 10.

The first sealing elements 36 of the fairing 20 comprise a second rigid longitudinal member 44 which extends along the lateral edge 20c of the fairing 20 and which cooperates by sealed support with the member 42, in said first position.

However, the reverse configuration shown in FIG. 8 is also possible. The member 42 could extend along the lateral edge 20c of the fairing 20, and the member 44 could extend along the lateral edge 10c of the flap 10.

Although this is not limitative, the first member 42 has a circular or elliptical cross-sectional shape, particularly when resting in the unstressed state. This member 42 preferably has a solid cross-section and is made of elastomer, for example.

In the example shown, the sealed support C1 between the members 42, 44 is a support oriented radially with respect to the axis A of the reverser 30.

The second member 44 comprises a longitudinal profile extending along the edge 20c and generating a radial excessive thickness on this edge. This member 44 or this profile comprises a longitudinal rim 46 which forms a lateral extension of the edge 20c and which externally covers the edge 10c of the flap in order to bear in the radial direction on the member 42. In this embodiment, the member 44 or the profile is generally L-shaped in cross-section.

The embodiment shown in FIG. 9 differs from the previous embodiment in that the member 44 does not comprise a rim 46 and the sealed support C2 between the members 42, 44 is a support oriented circumferentially with respect to the axis A of the reverser 30. One longitudinal side of the member 44 or of the profile is supported circumferentially on the member 42. In this embodiment, the cross-section of the member 44 or of the profile is generally parallelepipedal.

The reverse configuration shown in FIG. 9 is also possible. The member 42 could extend along the lateral edge 20c of the fairing 20, and the member 44 could extend along the lateral edge 10c of the flap 10.

The embodiment shown in FIG. 10 differs from the first embodiment in that there is no member 42. Only the member 44 is present on the fairing 20. Nor is there any sealed support between the first sealing elements.

The sealing between the fairing and the flap is ensured by a predetermined clearance between the member 44 and the lateral edge 10c of the flap. In the example shown, this clearance R1 is oriented in radial direction.

The member 44 also has an L-shaped cross-section and comprises a rim 46 which covers the lateral edge 10c of the flap and is separated from this edge by the radial clearance R1.

The reverse configuration shown in FIG. 10 is also possible. The member 44 could extend along the lateral edge 10c of the flap 10 and define a radial clearance R1 with the edge 20c of the fairing.

In the embodiment shown in FIG. 11, the first sealing elements 34 of the flap 10 comprise a first rigid longitudinal member 48 which extends along the lateral edge 10c of the flap 10.

The first sealing elements 36 of the fairing 20 comprise a second rigid longitudinal member 44 which extends along the lateral edge 20c of the fairing 20.

In this example, each of the members 42, 44 comprises a longitudinal profile extending along the corresponding edge and generating a radial excessive thickness on this edge. Each member 42, 44 or profile has a generally parallelepiped shape in cross-section.

The sealing between the fairing 20 and the flap 10 is ensured by a predetermined clearance between the members 42, 44. In the example shown, this clearance R2 is circumferentially oriented.

In the various embodiments shown in FIGS. 8 to 11, the rigid materials used for the sealing elements can be a metal, a composite or a thermoplastic, Teflon®, etc. The flexible materials used can be an elastomer or rubber. In the presence of a flexible sealing element, the sealing is obtained by support, and this support can be maintained when the parts undergo relative movements. In the absence of a flexible sealing element, the sealing is achieved by creating a baffle or obstacle limiting the passage of air. By optimising the dimensions (L, R1, R2, H1, H2, etc.) of the members and profiles, and in particular the portions that define the baffles or overlaps, it is possible to optimise the sealing of the assembly. Moreover, the absence of contact between the parts allows to reduce the risk of wear.

The invention is particularly advantageous because it allows to provide a solution to the above problem, without affecting the aerodynamic internal faces of the flaps, which must be defined by rigid walls so as not to alter the deflection and acoustic performance of the flaps.

The invention claimed is:

1. A thrust reverser for a nacelle of an aircraft turbofan engine, the thrust reverser having a generally annular shape about an axis and comprising:
   a stationary upstream annular structure which extends around an annular duct for a secondary flow,
   deflection grids distributed around the axis,
   at least one annular cover movable in axial translation relative to the stationary structure, from an upstream position in which the grids are covered, to a downstream thrust-reversal position in which the grids are uncovered, the cover comprising an upstream annular segment and a downstream annular segment,
   fairings carried by the cover, these fairings being distributed around the axis, each of the fairings extending inside and at a distance from the upstream segment of the cover and comprising a downstream base connected to an upstream end of the downstream annular segment of the cover, an upstream tip, and two lateral edges connecting the tip to the base,
   deflection flaps for deflecting the secondary flow through the grids, the flaps being distributed around the axis and mounted between the fairings, the flaps being movable from a first position in which the flaps extend inside and at a second distance from the upstream segment of the cover and in an extension of the adjacent fairings of the fairings, when the cover is in the upstream position, and a second position in which the flaps extend into the duct to deflect the secondary flow, when the cover is in the downstream position, each of the flaps comprising:
      an upstream edge designed to be flush with said upstream structure in the first position,
      a downstream edge intended to be flush with the upstream end of the downstream segment of the cover in the first position, and
      lateral edges each comprising two portions, respectively an upstream portion and a downstream portion, the upstream portions of the lateral edges of the flaps being flush with the upstream portions of the lateral edges of adjacent flaps in the first position, and the downstream portions of the lateral edges of the flaps being flush with the lateral edges of the fairings in the first position, and flush with the downstream portions of the lateral edges of the flaps in the second position,
   and a moving device for moving the cover and the flaps,
   wherein each of the flaps comprises a rigid wall extending as far as each of the upstream edge, the downstream edge, and the lateral edges of the respective flap, and defining each of the upstream edge, the downstream edge, and the lateral edges of the respective flap, the wall comprising an aerodynamic internal face and an external face facing the upstream segment of the cover in the first position,
   and in that the reverser further comprises:
   first sealing elements located on the external face of the wall of each of the flaps and/or on an external face of each of the fairings, the first sealing elements extending along the lateral edges of the flaps and/or of the lateral edges of the fairings so as to provide a sealing along the lateral edges of the flaps and the lateral edges of the fairings in the first position.

2. The thrust reverser according to claim 1, wherein the first sealing elements each comprise:
   a first elastically deformable longitudinal member which extends along the lateral edge of the respective flap, and
   a second rigid longitudinal member which extends along the lateral edge of the respective fairing and which cooperates by sealed support with said first member, in said first position, or conversely, a third elastically deformable longitudinal member which extends along the lateral edge of the respective fairing, and a fourth rigid longitudinal member which extends along the lateral edge of the respective flap and which cooperates by sealed support with said third member, in said first position.

3. The thrust reverser according to claim 2, wherein said sealed support with said first member or said sealed support with said third member is a radially oriented support or a circumferentially oriented support with respect to said axis.

4. The thrust reverser according to claim 2, wherein the second member or the fourth member is L-shaped or parallelepipedal in cross-section.

5. The thrust reverser according to claim 2, wherein the second member or the fourth member comprises a longitudinal profile extending along an edge to which the second member or the fourth member is attached and generating a radial excessive thickness on the edge to which the second member or the fourth member is attached.

6. The thrust reverser according to claim 5, wherein the profile comprises a longitudinal rim forming a lateral extension of the edge to which the second member or the fourth member is attached.

7. The thrust reverser according to claim 1, wherein the first sealing elements each comprise:

a first rigid longitudinal member which extends along the lateral edge of the respective flap, and optionally a second rigid longitudinal member which extends along the lateral edge-of the respective fairing and which is separated by a first predetermined clearance from said first member, in said first position, or conversely, a third rigid longitudinal member which extends along the lateral edge of the respective fairing, and optionally a fourth rigid longitudinal member which extends along the lateral edge of the respective flap and which is separated by a second predetermined clearance from said third member, in said first position.

8. The thrust reverser according to claim 7, wherein said first clearance or said second clearance is a radial clearance or a circumferential clearance with respect to said axis.

9. The thrust reverser according to claim 1, wherein each of the flaps comprises:

a second sealing element located on the external face of the wall and/or on the upstream end of the downstream segment of the cover, the second sealing element extending along the downstream edge of the respective flap so as to seal or reduce leakages along the downstream edge in the first position.

10. The thrust reverser according to claim 9, wherein the second sealing element is fitted and attached to the external face of the wall and/or to the upstream end of the downstream segment of the cover.

11. The thrust reverser according to claim 9, wherein the second sealing element is integrated into the wall of the flap and/or on the upstream end of the downstream segment of the cover.

12. The thrust reverser according to claim 1, wherein each of the flaps has no sealing element along the upstream edge of the respective flap.

13. The thrust reverser according to claim 1, wherein the first sealing elements are fitted and attached to the external face of the wall of each of the flaps and/or to the external face of each of the fairings.

14. The thrust reverser according to claim 1, wherein the first sealing elements are integrated into the wall of each of the flaps and/or into each of the fairings.

15. A propulsion unit for an aircraft, comprising a turbofan engine and the thrust reverser according to claim 1.

* * * * *